May 4, 1965 G. W. DAVIS 3,181,301
METHOD AND APPARATUS FOR ENTRENCHING A SECTION
OF PIPELINE IN A RIVERBED
Filed May 18, 1961 2 Sheets-Sheet 1
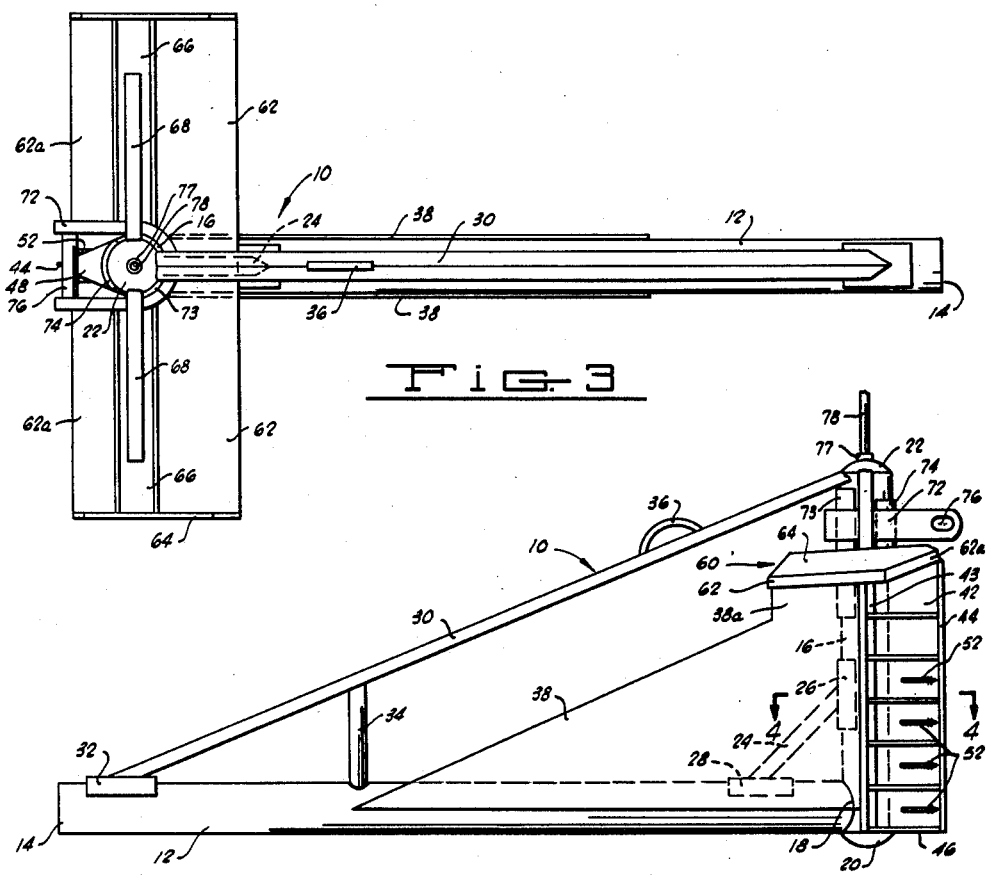
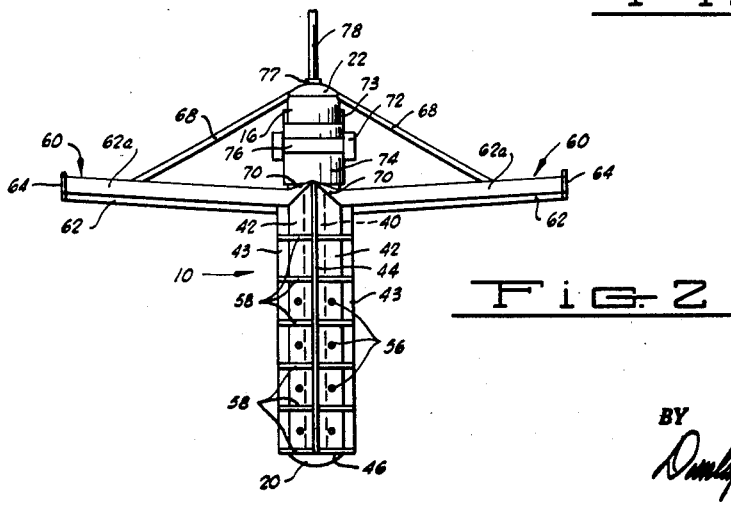
INVENTOR.
GEORGE W. DAVIS
BY
*Dunlap, Laney & Hubbard*
ATTORNEYS May 4, 1965  G. W. DAVIS  3,181,301
METHOD AND APPARATUS FOR ENTRENCHING A SECTION
OF PIPELINE IN A RIVERBED
Filed May 18, 1961  2 Sheets-Sheet 2
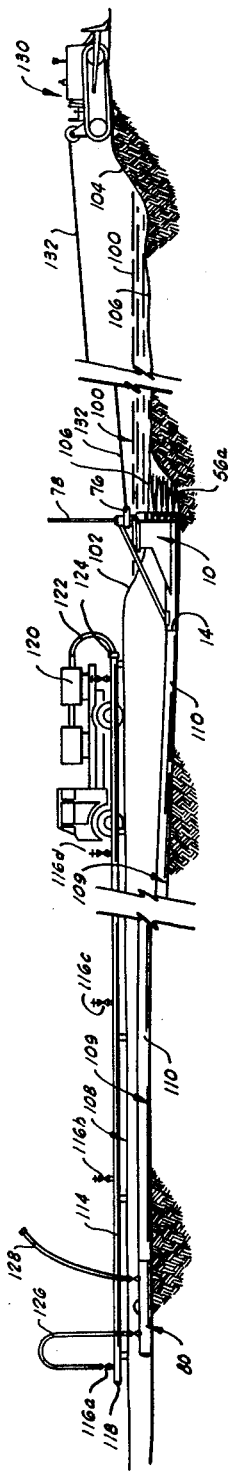
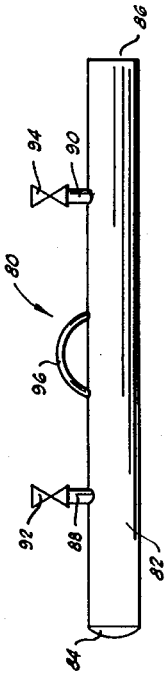
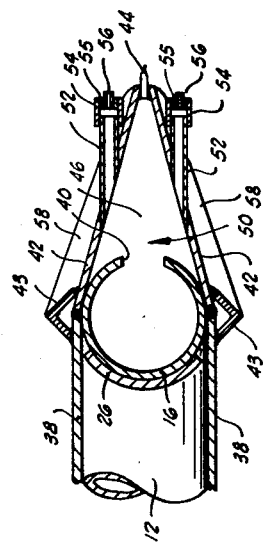
INVENTOR.
GEORGE W. DAVIS
BY
Dunlap, Laney & Hubbard
ATTORNEYS

United States Patent Office 3,181,301
Patented May 4, 1965

3,181,301
METHOD AND APPARATUS FOR ENTRENCHING A SECTION OF PIPELINE IN A RIVERBED
George W. Davis, Box 6072, Cimarron Station, Oklahoma City 11, Okla.; Alice C. Davis, executrix of said George W. Davis, deceased
Filed May 18, 1961, Ser. No. 110,941
6 Claims. (Cl. 61—72.4)

The present invention relates to the art of pipeline construction and more particularly, but not by way of limitation, relates to a method and apparatus for entrenching a section of pipeline in the bed of an active river.

The petroleum industry annually constructs many miles of pipelines to gather crude oil and to transport petroleum products. In the southwestern regions of this country, it is frequently necessary to construct these pipelines across flowing, active rivers. Most rivers of this region are very wide but relatively shallow and have sedimentary beds of silt and sand which extend to a substantial depth. For this reason, experience has shown that it is more economical to bury or entrench the pipeline in the sedimentary bed of the river rather than construct a bridge over the river for the pipeline.

Heretofore, pipelines have been entrenched in the beds of rivers by rather direct and expensive methods. Each bank of the river is trenched to the proper grade and depth to provide a continuous slope for the pipeline to be installed at a desired depth under the flowing water, usually three or four feet. The approach ditches may be dug by any suitable earthworking machinery, such as caterpillar tractors, ditching machines or draglines. Draglines are then used to dig a trench across the bed of the river. In most cases, two draglines are used, each starting at approximately the middle of the river and working outwardly toward the opposite banks. The river current, which is almost always flowing to some extent, tends to quickly fill the trench as it is dug with sediment.

It is not uncommon when constructing a river crossing one thousand feet in length, for example, to work for two or three weeks with draglines digging the initial trench in the riverbed. By the time the initial trench is completed, it will frequently be partially filled with sediment and will require refinishing just prior to placing the pipeline in the trench. After the trench has been completed, a section of pipeline, usually welded together and wrapped and coated with anticorrosive materials and sufficiently long to extend from bank to bank, is pulled through the trench in the riverbed and across the river. Then each end of the pipeline section is welded or otherwise connected to the remainder of the pipeline. The river current will soon cover the section of pipeline placed in the trench with silt, and the pipeline river crossing is then completed. Due to the protracted length of construction time and the required use of expensive, heavy earthworking equipment, this type of river crossing is very expensive. Also, the deeper the trench is cut in the riverbed, the quicker the trench will be filled with deposits from the river current. Therefore, it is difficult to bury the pipe at depths greater than three feet below the bed of the river. Of course, when it is desired to bury the pipe at greater depths, the expense of installation rises sharply.

Therefore, it is contemplated by the present invention to provide a method for entrenching a section of pipeline in the bed of a river comprising the steps of connecting a fluid jet device to one end of the section of pipeline, supplying fluid under pressure to the fluid jet device so that the fluid will be expelled at high velocity to form a fluid jet, and then moving the section of pipeline across the river whereby the fluid jet will cut a trench in the bed of the river as the section is moved along and the section of pipeline will simultaneously be placed in the trench before the river current can fill the trench with sediment.

It is also contemplated by the present invention to provide a jet device for attachment to the end of the section of pipeline to be entrenched comprised, in its broader aspects, of a fluid jet nozzle means directed away from the section of pipeline and a vertically extending member attached to the jet nozzle means. A flexible tension line can then be attached to the vertically extending member and the jet nozzle device, and the section of pipeline to which the nozzle device is attached can be pulled across the river with the jet nozzle device and the section of pipeline disposed below the bed of the river.

Therefore, it is an important object of the present invention to provide an improved method for entrenching a section of pipeline in the bed of a river.

Another object of the present invention is to provide a method of the type described by which a section of pipeline can be buried at greater depths below the bed of a river.

Another object of the present invention is to provide a method of the type described by which a pipeline river crossing can be completed in a minimum of time.

Another object of the present invention is to provide a method of the type described which does not require the use of draglines or other expensive ditching equipment.

Another object of the present invention is to provide a fluid jet nozzle device by which the above-described method can be practiced.

Another object of the present invention is to provide a fluid jet device of the type described which is exceedingly strong and stable and will be maintained in an upright position for proper operation.

Another object of the present invention is to provide a fluid jet device which will automatically regulate the maximum depth the pipeline will be entrenched below the riverbed.

Another object of the present invention is to provide a fluid jet device which will cut through obstructions such as tree branches, roots and hard-surfaced crusts in the path of the fluid jet device.

Still another object of the present invention is to provide a device by which water can be supplied to the end of the section of pipeline being installed while the section is being moved across the river without moving the pumping equipment supplying the fluid.

Additional objects and advantages will be evident from the following detailed description and drawings wherein:

In the drawings:

FIGURE 1 is a side elevation of a device constructed in accordance with the present invention.

FIGURE 2 is a front elevation of the device of FIG. 1.

FIGURE 3 is a top view of the device of FIG. 1.

FIGURE 4 is a partial cross-sectional view taken along line 4—4 of FIG. 1.

FIGURE 5 is a side elevation of a device used in practicing the method of the present invention.

FIGURE 6 is a schematic side elevation, partially in section, illustrating the method of the present invention.

Referring now to FIGS. 1 through 4, a fluid jet nozzle device, in accordance with the present invention, is indicated generally by the reference numeral 10. An adapter conduit 12 is fabricated of a heavy-duty section of pipe. The adapter conduit has one end 14 which is adapted to be connected to a section of pipeline by some suitable method, such as by welding. It is desirable that the adapter conduit 12 have the same diameter as the diameter of the section of pipeline to be installed, but may have a greater or lesser diameter and, in which case an adapter would be connected to the adapter conduit 12 at end 14. The adapter conduit 12 is preferably connected to the section of pipeline by welding but may be connected by any suitable coupling which is fluid-tight and which has a tensile strength preferably equal to or greater than the tensile strength of the section of pipeline.

An upright section of pipe 16 is welded to the end of the adapter conduit 12 by a saddle connection 18 shown in dotted outline. The conduit 16 is also shown in dotted outline in FIG. 1. The bottom of the conduit 16 is closed by a cap 20 and the top is closed by a similar cap 22. The conduit 16 is braced in a vertical position by an angle iron brace 24, shown in dotted line, which is welded to a pad 26 which is welded to the upright conduit 16, and to pad 28 which is welded to the adapter conduit 12. Another diagonal brace 30 is welded to the upper end of the upright conduit 16 and to a pad 32 which is welded to the adapter conduit 12. A tubular brace 34 interconnects the conduit 12 and the angle iron brace 30 at a mid-point. A handling loop or eye 36 is welded to the brace 30 for handling the fluid jet device by means of a cable and hook. Two heavy-duty triangular plates 38 are welded along each side of the adapter conduit 12 and the upright conduit 16 and serve to rigidly brace the upright conduit 16 and also to stabilize the device as hereafter described in detail.

A large slit 40 (see FIGS. 2 and 4) is cut in the front of the upright conduit 16 and extends substantially the entire length of the conduit. The edges of a pair of plates 42 are then abutted against the edges of the plates 38 and the plates 42 are securely welded to the plates 38 and to the conduit 16. A pair of angle iron braces 43 are welded over the welded butt joint for reinforcement and to make the upstanding device of greater width than the adapter conduit 12. A knife edge 44 is welded between the junction of the two plates 42 as best seen in FIG. 4. A bottom plate 46 is welded to the plates 42 and conduit 16 to close the opening at the bottom of the two plates 42, and a top plate 48 (see FIG. 3) is welded to the plates 42 and conduit 16 to close the top. This construction provides a fluidtight chamber 50 which is bounded by the conduit 16, the two plates 42 in conjunction with knife edge 44, the bottom plate 46 and the top plate 48.

A plurality of tubular conduits 52 communicate with the chamber 50. The conduits 52 are welded to the plates 42 and are preferably disposed in pairs, one on each side of the knife edge 44. Any number of conduits 52 may be used and may be directed as desired. A collar 54 is preferably welded or threaded onto each conduit 52. A reducer 55 may be threaded into the collar 54 and a small nozzle 56 threaded into the reducer 55. With this construction, the nozzles 56 can be readily removed from the reducers 55 and replaced in the case of excessive cutting due to high velocity fluid being jetted from the nozzles 56. A plurality of reinforcing ribs 58 may be provided to strengthen the plates 42 against large forces acting on the knife edge 44 and to prevent the very high pressure present in the chamber 50 from rupturing the plates 42.

A wing 60 is provided on each side of the conduit 16 to control the maximum depth to which the jet device 10 will penetrate. The wings 60 are preferably fabricated from a single sheet of steel 62 welded to extensions 38a (see FIG. 1) of the plates 38. The sheet steel has a sharply upwardly sloped portion 62a adjacent the front thereof and also slopes upwardly from the center toward the outer tips as best seen in FIG. 2. Reinforcing tip plates 64 are welded to the outer ends of the plate 62. H beams 66 (FIG. 3) may be welded to the conduit 16, to the plate 62, and to the end plates 64 for reinforcement purposes. Diagonal channel braces 68 interconnect the top of the conduit 16 and the H beams 66 for additional bracing. The plates 62 are welded around the periphery of the structure comprised of the conduit 16 and the plates 42 and preferably extend upwardly to the knife edge 44 at points 70.

A U-shaped strap 72 passes around the upper end of upstanding conduit 16 as best seen in FIG. 3. The conduit 16 is reinforced by pads or gussets 73 and 74 which are interposed between the U-shaped strap 72 and the conduit 16. A bar 76 is passed through the ends of the strap 72 and welded thereto to provide a very strong eye to which a flexible tension line can be attached as hereafter described in detail.

A small collar 77 may be welded on top of the cap 22 so that a length of pipe 78 can be threaded therein. The length of pipe 78 then serves as a means for visually locating the jet device 10 during installation of a section of pipeline as hereafter described in detail.

Referring now to FIG. 5, a tail plug is indicated generally by the reference numeral 80 and is utilized on the trailing end of a pipeline section, as will be described. The tail plug 80 comprises a length of pipe 82 preferably of the same diameter as the section of pipeline to be entrenched. One end of the conduit 82 is closed by a weld cap 84. The other end 86 of the conduit 82 is adapted to be connected to the section of pipeline by welding or some other suitable method to provide a fluidtight coupling. A pair of taps 88 and 90 are in fluid communication with the interior of the conduit 82 and are provided with quick-opening valves 92 and 94, respectively. A loading eye 96 may be provided for loading the tail plug device.

Referring now to FIG. 6, a river having a water line 100 and banks 102 and 104 is schematically illustrated. The bed of the river is indicated by the line 106 and the depth of the water may be from a few inches to several feet. The banks 102 and 104 may be, for example, eight hundred to one thousand feet apart, and the riverbed and the banks will usually be of a sedimentary-type soil composed of sand and silt. Due to limitation of space, the drawing cannot be made to scale, and therefore the width of the river is broken as shown. However, it is to be understood that rivers of considerable width may be traversed by the pipeline section. The normal level of the bank and surrounding country is indicated by the line 108. In most cases the pipeline to be installed will be of welded-joint construction and will be wrapped and coated with suitable anti-corrosion material in the conventional manner. The pipeline is usually buried to some depth below the surface of the terrain 108 by suitable conventional ditching machinery.

A section of pipeline 110 to be installed is fabricated by welding a sufficient number of joints together to form a length of pipeline long enough to reach from bank 104 to bank 102. The section of pipeline is wrapped and coated with anti-corrosion materials and readied for final installation. The bank 102 is prepared for installation of the river crossing by digging an approach trench 109 to the desired approach grade by suitable ditching equipment so that when the section is installed in the riverbed it can readily be connected by welding to the other sections of the pipeline.

The fluid jet nozzle 10 is then welded at the adapter end 14 to one end of the section of pipeline 110 to be installed. The tail plug device 80 is welded or otherwise connected to the other end of the pipeline section 110. The pipeline section 110 is then placed in the approach trench 109 substantially as shown in FIG. 6 with the fluid jet nozzle device 10 adjacent the edge of the river and resting substantially on the desired grade.

A water supply header 114 is laid substantially parallel to the pipeline section 110. The header 114 has a number of taps 116 equipped with quick-opening valves 116a, 116b, 116c and 116d spaced at substantially uniform intervals therealong. A cap or bull plug 118 closes one end of the header 114. A suitable water pump unit 120 is disposed preferably at the end 124 of the header 114 which is adjacent the river. A hose 122 is connected between end 124 of the header and the pump unit 120. By disposing the pump unit 120 adjacent the bank of the river, water can be taken from the river and pumped into the header 114. While water is the fluid which is more readily available and easily adapted for the present invention, it is to be understood that, in its broader scope, any suitable fluid, such as air, for example, may be used instead of water.

Two flexible pressure hoses 126 and 128 are connected to the valves 92 and 94 of the tail plug 80. These flexible hoses must withstand a substantial pressure and therefore are usually limited by practical considerations to lengths of approximately fifty feet. The hose 126 is connected to a valve 116a. The valves 92 and 116a are then opened. One or more pulling units 130 having a flexible winch line 132 are positioned on the opposite bank 104 of the river at a point where the pipeline river crossing will terminate. The flexible line 132 of the pulling unit is then extended across the river and connected to the bar 76 of the fluid jet device 10.

The pumping unit 120 is started and water is introduced under pressure through flexible conduit 122 to the header 114. All valves on the taps 116 are closed except valve 116a to which hose 126 is connected. Water passes through the hose 126, through valve 92 into the tail plug 80 and into the pipeline section 110. The water then passes through the adapter conduit 12 and into the chamber 50 within the fluid jet nozzle means and is expelled at high velocity from the nozzles 56 to form a water jet 56a. The high velocity water jet 56a erodes the sedimentary soil of the riverbed and cuts a trench in front of the fluid jet nozzle device 10. The pulling unit 130 is then actuated to pull the fluid jet device 10 and the pipeline section 110 across the river. The wings 60 of the fluid jet device ride on the bed of the river on each side of the trench being cut to prevent the device from cutting too deeply into the riverbed. The plates 38 slide against the sides of the trench and maintain the fluid jet device 10 in a proper upright position. The length of pipe 78 protrudes above the water in the river to give a visual indication of the location of the fluid jet device 10 as it is pulled across the river.

As the section 110 of pipeline is moved across the bed of the river, the hose 128 is connected to the next valve 116b. The valve 116b and valve 94 are then opened to permit fluid to pass from the header 114 through hose 128 into the section 110. Valve 92 and the valve 116a are then closed and the hose 126 disconnected from the valve 116a. When the section 110 has moved forward enough for the hose 126 to be connected to the next valve 116c, water is then pumped through valve 116c and hose 126 into the section 110. By using this step-by-step connection of the hoses 126 and 128 to the several taps 116 of the header 114, a continuous supply of water under pressure is supplied to the fluid jet device 10.

As the fluid jet device 10 is pulled across the river by the pulling unit 130, the high velocity water jet 56a continuously cuts a trench in the riverbed in front of the device 10. Should the device 10 encounter buried logs or similar debris, or a hard sedimentary crust, the knife edge 44 will readily cut through the obstructions. When the device 10 is pulled onto the bank 104 a sufficient distance that the joint 14 is beyond the water's edge and can be reached conveniently, the pump 120 and the pulling unit 130 are stopped. The pipeline section 110 will then be resting in the trench cut by the water jet. The fluid jet device 10 and the tail plug 80, which is still at the bank 102, are disconnected from the pipeline section 110. The section 110 is then connected at each end to the remainder of the pipeline and the pipeline river crossing is complete. The river current will soon fill the trench in the riverbed with sediment and the pipeline will be buried in the riverbed and protected from the river current and objects carried thereby.

From the above description it will be evident that a novel method for entrenching a section of pipeline in the bed of a river has been disclosed. The section of pipeline may be installed in a matter of hours rather than weeks. For example, a section of eight-inch pipeline over 800 feet in length and completely wrapped and coated has been entrenched at a minimum depth of four feet in approximately four hours, after the preliminary bank preparation and connection work. Substantially the entire crossing was made in one working day. The pumping unit supplied 7 bbls./minute at 1800 p.s.i.g. to the tail plug 80. The fluid jet device 10 was pulled across the river at the rate of approximately seven feet per minute. In many installations it may be unnecessary to make the preliminary trench 109 to grade prior to starting the fluid jet in operation because the action of the water jet 56a will begin to cut a trench, then the flexibility of the section 110 will permit the jet 56a to point downwardly to rapidly reach the maximum depth regulated by the wings 60.

The preferred construction of the fluid jet device described provides a strong, economical construction. The knife blade 44 provides a means for cutting through most obstructions which will be encountered in the bed of a river of the type described. The side plates 38 provide both a reinforcement means and a means for insuring that the fluid jet device remains in the upright position. The wings 60 insure that the fluid jet device does not cut so deeply into the riverbed that the capacity of the water jet 56a to cut the trench is exceeded, in which case the pulling unit 130 would be unable to pull the device across the river. The header 114 and associated structure provides a practical means of supplying water at high pressure to the section of pipeline which is continually moving. Of course, a single length of flexible hose could be employed, but this is economically impractical due to the large volume and high pressure of the water to be pumped. The angle iron strips 43 serve both as reinforcement and as a means for insuring that the trench is wider than the diameter of the pipeline section and thereby compensate for the anticorrosion wrapping and coating applied to the pipeline section.

Having thus described preferred embodiments of my invention, it is to be understood that various changes and substitutions can be made therein without departing from the spirit and scope of my invention as defined by the appended claims.

I claim:

1. A method of entrenching a section of pipeline in the bed of a river comprising the steps of:

positioning the section on one river bank;

connecting a fluid jet nozzle means to one end of the section;

connecting a source of fluid under pressure to the other end of the section;

supplying fluid under pressure to said nozzle means from said source through said section;

pulling said section lengthwise across said riverbed toward the other bank wherein the end connected with said nozzle means precedes the remainder of the section;

forming a trench by expelling fluid at high velocity through said nozzle means as said nozzle means and section is moved; and, simultaneously moving the section into the trench formed by said nozzle means until the section extends across said river.

2. A pipeline entrenching device comprising:

an elongated section of conduit;

a source of fluid under pressure;

a conduit having one end connected in fluid communication with one end of said section and having the other end thereof connected with said source of fluid pressure; and, nozzle means connected with the other end of said section and including:

a horizontally disposed adapter conduit having one end connected for fluid communication with said section, an elongated conduit connected at one end for fluid communication with said adapter conduit and disposed at a substantially right angle thereto, means forming a fluid chamber extending partially along said elongated conduit and in fluid communication therewith, a plurality of nozzle members mounted in spaced relation on said chamber forming means, said nozzle members being in fluid communication with said chamber, and means mounted on said elongated conduit for connecting a tension line thereto.

3. A device for entrenching a section of pipeline in the bed of a river comprising:

a horizontally disposed tubular adapter conduit connected with one end of the section and in fluid communication therewith;

an elongated conduit connected in fluid communication with said adapter conduit and disposed at a substantially right angle thereto;

means forming a fluid chamber extending partially along said elongated conduit and in fluid communication therewith;

a plurality of nozzle members mounted in spaced relation on said chamber forming means, said nozzle members being in fluid communication with said chamber; and, means mounted on said elongated conduit for connecting a tension line thereto.

4. A device for entrenching a section of pipeline in the bed of a river as defined in claim 3 further characterized by plate means connected at right angles to said chamber forming means above said nozzle members disposed at right angles to the axis of said tubular adapter conduit, whereby said plate means will engage either side of a trench in which the device is traveling to prevent the device from lowering below a maximum depth.

5. A device for entrenching a section of pipeline in the bed of a river as defined in claim 3 further characterized by an elongated knife edge connected to the chamber forming means and extending parallel thereto and projecting from the fluid chamber beyond the nozzle means.

6. A device for entrenching a section of pipeline in the bed of a river as defined in claim 3 further characterized by a pair of parallel plates, one plate connected to one side of both the adapter conduit and the chamber forming means and the other plate connected to the other side of the adapter conduit and chamber forming means for maintaining the chamber forming means and elongated conduit in an upright position as the device is pulled through a trench by engagement of the plates with the walls of the trench.

References Cited by the Examiner
UNITED STATES PATENTS

| | | | |
|---|---|---|---|
| 815,163 | 3/06 | Hatfield | 61—72.4 |
| 996,866 | 7/11 | Lilly | 61—72.7 |
| 2,602,300 | 7/52 | Collins | 61—72.4 |
| 2,659,211 | 11/53 | Notarbartolo et al. | 61—72.3 |
| 2,879,649 | 3/59 | Elliott | 61—72.4 |

FOREIGN PATENTS

| | | |
|---|---|---|
| 705,470 | 4/41 | Germany. |

EARL J. WITMER, *Primary Examiner.*

JACOB L. NACKENOFF, JACOB SHAPIRO,
*Examiners.*